(12) United States Patent
Hazenson

(10) Patent No.: US 8,000,225 B1
(45) Date of Patent: Aug. 16, 2011

(54) METHOD OF BUILDING FLEXIBLE AND EFFECTIVE TRANSMISSION SYSTEMS FOR TWO-WAY COMMUNICATIONS WORKING IN CODE DOMAIN

(76) Inventor: Michael Boris. Hazenson, Los Angeles, CA (US)

( * ) Notice: Subject to any disclaimer, the term of this patent is extended or adjusted under 35 U.S.C. 154(b) by 11 days.

(21) Appl. No.: 12/497,584

(22) Filed: Jul. 3, 2009

Related U.S. Application Data

(62) Division of application No. 10/907,289, filed on Mar. 28, 2005, now Pat. No. 7,558,242.

(51) Int. Cl.
*H04J 11/00* (2006.01)
*H04B 7/212* (2006.01)

(52) U.S. Cl. ......... 370/208; 370/337; 370/347; 370/442

(58) Field of Classification Search .................. 370/208, 370/210, 321, 337, 347, 442
See application file for complete search history.

(56) References Cited

U.S. PATENT DOCUMENTS

| | | | |
|---|---|---|---|
| 5,959,979 A * | 9/1999 | Stratmoen | 370/276 |
| 6,016,311 A | 1/2000 | Gilbert | |
| 6,330,230 B1 | 12/2001 | Råsånen | |
| 6,549,759 B2 | 4/2003 | Arviv | |
| 6,944,118 B2 * | 9/2005 | Boasson et al. | 370/203 |
| 6,954,432 B1 * | 10/2005 | Bychowsky et al. | 370/236 |
| 7,382,718 B2 * | 6/2008 | Chang et al. | 370/204 |
| 7,610,025 B2 * | 10/2009 | Fernandez-Corbaton et al. | 455/114.2 |
| 2003/0039223 A1 * | 2/2003 | Dupuy | 370/328 |
| 2004/0114506 A1 * | 6/2004 | Chang et al. | 370/208 |
| 2004/0190439 A1 * | 9/2004 | Komp et al. | 370/208 |
| 2005/0113110 A1 * | 5/2005 | Joo et al. | 455/456.1 |
| 2010/0165828 A1 * | 7/2010 | Michaels et al. | 370/208 |

OTHER PUBLICATIONS

Warren Hioki, Telecommunications, 1998, Third Edition, pp. 277-278, Prentice-Hall, Inc. Upper Saddle River, USA.
Andrew S. Tanenbaum, Computer Networks, 2002, Fourth Edition, pp. 275-278, Prentice-Hall, Inc, Upper Saddle River, USA.
Roy Blake, Wireless Communications Technology, 2001, pp. 226-237, Delmar, Albany, USA.
Roy Blake, Electronic Communication Systems, 2002, pp. 682-683, Delmar, Albany, USA.

* cited by examiner

*Primary Examiner* — Andrew Lee

(57) ABSTRACT

A method of building transmission systems using for two-way communications code division multiplexing is disclosed. For "point-to-point" transmission systems, which structure is shown on FIG. 1 and which resources are represented as plurality of orthogonal polynomials, the method provides flexible and effective distribution transmission resources.

3 Claims, 3 Drawing Sheets

METHOD OF BUILDING FLEXIBLE AND EFFECTIVE TRANSMISSION SYSTEMS FOR TWO-WAY COMMUNICATIONS WORKING IN CODE DOMAIN

CROSS-REFERENCE TO RELATED APPLICATIONS

This is a division of application Ser. No. 10/907,289, Filed 2005 03 28 now U.S. Pat. No. 7,558,242, granted Jul. 7, 2009.

BACKGROUND OF INVENTION

1. Field of Invention

This invention relates to the field of telecommunication, specifically to methods of building transmission systems.

2. Prior Art

One of the trends in the telecommunication systems is associated with the development of methods providing better utilization of transmission resources in existing transmission systems, especially for transmission of discontinuous, burst traffic created by the plurality of simultaneously working sources of information. The most effective method used now for this purpose is statistical multiplexing. High efficiency of statistical multiplexing is achieved because of several features that distinguish it from other methods of multiplexing such as Time Division Multiplexing and Frequency Division Multiplexing. These features are:

Data presented as frames, packets, datagrams, or cells are transmitted through the transmission system at maximum transmission rate. This is why the statistical multiplexing has the shortest transmission time in contrast to other methods, where the frames are transferred using only part of transmission system's resources (time, frequency, and wavelength).

Every frame uses all transmission resources of transmission system but only for the time that is necessary for transmission. All other time the transmission resources are available for transmission of other frames. As a result, the transmission resources of the transmission system are distributed among frames coming simultaneously for transmission in the same direction in proportion to frames volumes. All other methods of multiplexing usually assign for every of simultaneously transferred frames only part of transmission resources. These provide in case of statistical multiplexing lowest than for other methods of multiplexing average time that the frame spends in the transmission system. This average time includes an average time of waiting transmission and an average time of transmission frames.

Depending on the requirements, every frame can be served with a different quality of service by applying to them different priorities.

Most transmission systems provide two-way communications by using two separate channels with equal bandwidth, each carrying data in one direction only. Applying statistical multiplexing for distribution transmission resources among streams of data sent in one direction to every channel independently allows achievement of high quality of service and high level of utilization of transmission resources in every direction of transmission. However, when the system is working, every moment it sends different volume of data in opposite directions and, as a result, provides different quality of service for data sent in opposite directions. In these systems, every channel in some periods can be overloaded, whereas the channel, which sends data in the opposite direction, in these periods can be empty, waiting for data.

Another problem that exists in every telecommunication network is associated with the fact that the resources necessary for transmission of data through every transmission line are determined at the period with the highest volume of traffic called the pick or rush hour. The time when the volume of traffic is high has usually length several hours a day only. At all other times the transmission systems are underloaded. As a result, the utilization of resources of transmission systems is low and unneeded consumption of energy takes place.

At present, there are several know cases, where the same channel is used to carry signals in opposite directions simultaneously. One of them was developed and implemented in so-called local loops of public telephone networks, where for two-way voice and data transmission between a telephone set and a nearest central office one pair of copper cable is used. In this case, no sharing and possibility of distributing resources between opposite directions take place. Two electrical signals with similar features, sent simultaneously through one common channel but in opposite directions, do not interfere within the channel. The receivers receive them on the opposite sides of the channel without corruption (see Warren Hioki, Telecommunications, $3^{rd}$ edition, 1998, pp 277-278). Another example, when one channel is used for sequential transmission of signals in opposite directions is half-duplex mode. In this mode every side of transmission system in turn get right to send waiting in buffer memory data and after this, transfer the right to send data to opposite side of transmission system. In the radio systems, the half-duplex mode allows using only one frequency for two-way communications. The half-duplex mode possesses two important futures. First, half-duplex mode uses one common channel for transmission in opposite directions. Second, distribution of transmission resources of the common channel depends on the volumes of traffic sent in opposite directions. This determines high flexibility of half-duplex mode. Half-duplex mode and statistical multiplexing have some common futures such as:

in both cases is used maximum transmission rate for transmission of every frame, the time, for which frames of data use the transmission resources, depend on their volumes.

However, the statistical multiplexing and half-duplex mode also have one significant difference. In half-duplex mode, the resources are distributed between opposite directions. There are several downsides in the half-duplex mode such as the time of propagation of signals, switching time and times for reestablishing of bit synchronization for every change in direction of transmission. These components are the cause of loss efficiency for the half-duplex mode.

For better understanding peculiarities of half-duplex mode, on FIG. 1 is shown the structure of "point-to-point" transmission system that includes two similar transceivers 30 and 32 working in half-duplex mode and transmission media 34 that connects the transceivers and is used for transmission signals between them. On FIG. 2 is depicted a time diagram of operation each transceiver. The time diagram shows a chain of periodically repeating sequence of operations. Every of them includes transmission of data, propagation of data to opposite side, switching from reception to transmission on the opposite side, propagation of data from opposite side, reception of data, switching transceiver from reception to transmission. Combination of the propagation times, the switching times and, not shown on FIG. 2, times for reestablishing bit synchronization after every change of direction of transmission represent losses of efficiency half-duplex transmission systems. As can be seen from FIG. 2, the efficiency of the system depends on the combined times of transmission and reception for the same values of propagation and switching times. The bigger they are, the higher the efficiency of transmission system working in half-duplex mode. However, with the growth of transmission and reception times, the delay in data transmission will grow too. Because of this, fewer types of data can be sent through this transmission system since some types of data are not compatible with the increase and variations in delay. This is especially true about data that require transmission in real time. Half-duplex mode cannot be effectively used for transmission of integrated traffic, because combined transmission and reception times have to be short for transmission of integrated traffic.

For some types of transmission systems, designers developed ways of improving efficiency in transmission systems while keeping their flexibility high. One example of the transmission system is GSM (Global System for Mobil communications) cellular system. There the time intervals of transmission and reception for every pair "base station-user station" are separated by the time intervals of communication between base station and others user stations. As a result, the loss in efficiency due to propagation and switching times are decreased.

Developers of the well-known LAN technology Ethernet considered the possibility that two transceivers without corruption can receive two signals sent through common transmission media by them and the fact of simultaneous transmission can be unrecognized. Because this is not acceptable for Ethernet technology, which used half-duplex mode, the developers established interdependency among values of 3 parameters of the system: the maximal length of cable, the minimal number of bits in frame, and the transmission rate. This allowed to ensure the 100% recognition of collisions in case of simultaneous transmission frames by two terminals (see Andrew S Tanenbaum, Computer Networks, 4th edition, 2002, pp 275-278). This technology allows easy and flexibly distribute transmission resources of the transmission system among connected terminals depending on their loads. However, in this case the efficiency of transmission is low.

Within recent years, many solutions were developed, which offer improvement of flexibility and efficiency mostly cellular or fiber optic transmission systems. However, no one of them offers a universal way of building effective and in the same time flexible transmission systems.

In U.S. Pat. No. 7,558,242 is described a method of building flexible and effective transmission systems for two-way communications that introduce new opportunities of increasing performance of transmission systems. The described there method are developed for transmission systems using time division multiplexing. However the elements of the method such as usage of time windows (TW), tying bit synchronization to TW synchronization, putting integer number of bits in the TW, using special codes—that all together allow eliminate loss of efficiency because of influence of propagation time, switching time, and time necessary for reestablishing synchronization when direction of transmission is changed—can be used for building flexible and effective transmission systems using for two-way communications code division multiplexing.

OBJECTS AND ADVANTAGES

The object of present invention is to develop a method of building flexible and effective transmission systems using code division multiplexing for transferring integrated traffic in opposite directions. This invention discloses the method that:

Can be used for long and short haul transmission systems; for copper cable, fiber optic, for wireless, including terrestrial and satellite microwave, and short-wave based transmission systems, Can be used to rapidly redistribute available transmission resources between opposite directions of transmission with an ability to control the direction of transmission for every position of TW, Can eliminate the loss of efficiency due to the propagation time, the transceiver's switching time, and the need of reestablishing the bit synchronization every time when the direction of transmission is changed, Can support transmission rate for every transmission system depending on the type and length of transmission media and the level of noise.

When implemented, the method will provide the following advantages over current transmission methods:

Free a part of frequency ranges currently used for two-way communications, pairs in copper cables and fibers or wavelengths in optical cables, Reduce the consumption of the energy by using only a part of the transmission resources any time except the busy hours, Increase a dynamic range of loads sent in any direction by putting limitations on a sum of sent in both directions loads but not on the load sent in each direction separately, Decrease the average time data spend in the transmission system, Improve the reliability and error protection of transmission systems, Measure the length of the transmission path, simultaneously with transmission data, Improve the protection of data sent through the transmission system against eavesdropping.

All these advantages are represented components of the efficiency of disclosed method and are achieved substantially because of its high flexibility.

SUMMARY OF INVENTION

In accordance with the present invention method of building flexible and effective transmission systems using for two-way communications code division multiplexing is developed. The method allows improving performance of transmission systems by providing the opportunity of flexible redistribution the transmission resources between opposite directions of transmission, by eliminating losses of efficiency because of influence of propagation time, switching time, and time that necessary for establishing synchronization after every change of direction of transmission.

DETAILED DESCRIPTION

Through this description, given embodiment and technical solutions should be considered as exemplars, rather than as

FIG. 1,3,4

Preferred Embodiment

Figure 1:
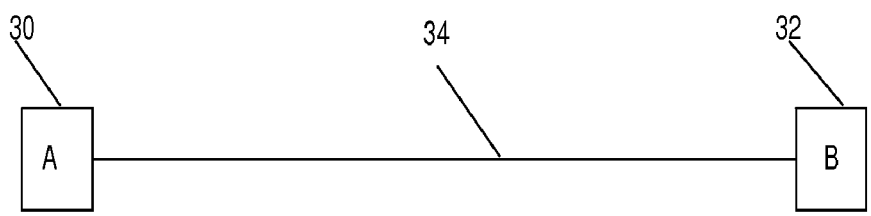
FIG. 1 shows a block diagram of "point-to-point" transmission system used common channel for two-way communications.
Figure 2:
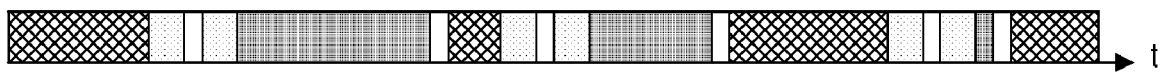
FIG. 2 shows a time diagram of "point-to-point" transmission system operating in half-duplex mode.

The structure diagram of "point-to-point" transmission system, for which present invention is disclosed, is depicted on FIG. 1 and is the same as for "point-to-point" systems operating in half-duplex mode. As shown on FIG the transmission system consists of two identical transceivers 30, 32, and transmission media 34 that connects the transceivers. Both transceivers send and receive signals to and from each other according to described below method.

To achieve its objective the present invention offers a method that, base on the known use of half-duplex mode in different transmission technologies, allows to resolve three following problems:
  Eliminate the influence given by signal's propagation time on the efficiency of the transmission system,
  Reduce to zero transceiver's switching time from transmission to reception and vice versa,
  Create bit synchronization insensitive to changes in direction of transmission and to variations of propagation time.

Propagation Time

The solution of the first problem is based on the fact that two signal with similar characteristics sent through a common channel by transceivers 30 and 32 simultaneously can be received on opposite sides without corruptions. Using this every transceiver 30 and 32 can transmit data through transmission media 34 any time except the time of reception data sent by the other transceiver. The data send by both transceivers propagate through the transmission media simultaneously, but when the propagated from opposite side signals approach transceiver it has to stop transmission and be ready to receive incoming data. After receiving data, transceiver can resume transmission. The only task that has to be solved is to prevent periods of transmission and reception against overlapping.

The overlapping can be avoid if the time of operations of each transceiver 30 and 32 is represented as a sequence of intervals, which lengths equal to the time of propagation signals in the transmission line. This interval is called here a Time Window (TW). Two transceivers synchronize their sequences of TWs by establishing the coincidence of beginning TWs. In this case when the time of operation in each transceiver is represented by the sequence of TWs and two sequences of TWs are synchronized, it is easy to avoid overlapping the transmission and the reception intervals. For this purpose every TW can be divided into several disjoint intervals every of which can be assigned for transmission or reception data. For every interval used to send data by one transceiver, the other transceiver creates the interval, which used for reception the data. These two intervals have the same positioning inside their TWs, however, the transmission is accomplished in TW N of one sequence but the reception is accomplished in TW N+1 of the other sequence.

To avoid overlapping, it is necessary to divide identically every TW of both sequences into plurality disjoint intervals, which called here sub TW, and for every sub TW assigned for transmission in on sequence the same sub TW to assign for reception in the next TW of the other sequence.

Figure 3:
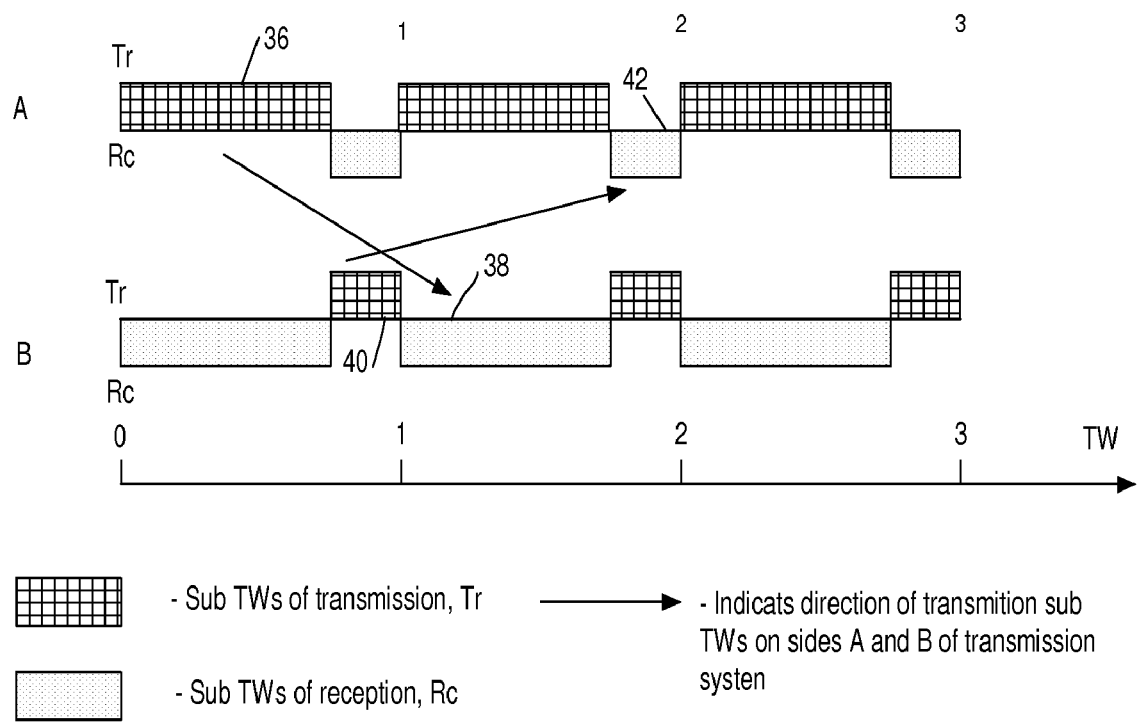
FIG. 3 shows a time diagram of "point-to-point" transmission system operating using disclosed method allowing eliminate influence of the propagation time on the efficiency.

FIG. 3 shows the time diagram that illustrates an order of transmission and reception data organized in two synchronized sequences of sub TWs. On FIG TW1 includes two sub TWs on both sides. Sub TW 36 is used for transmission data from side A to side B. Data transmitted in this sub TW are received in sub TW 38 on the side B with delay equal to the propagation time. Data sent from side B in sub TW 40 of TW 1 are received on the side A in sub TW 42 of TW 2. Here on both sides of the transmission system after the transceiver finishes sending data during one sub TW, it starts immediately reception data coming during the next sub TW. In contrast to transmission systems working in half-duplex mode, the transceivers here after they finish transmission data do not waste time for waiting when the data sent from the opposite side come.

In general, some sub TWs can be free from transmission or reception data. Also on FIG. 3 the switching times are not shown because below will be described ways to reduce the switching times to zero. However, in case if switching time is not zero, the number of bits sent and received in every sub TW have to be decreased by the number of bits that can be transmitted for interval equal to the switching time.

Described here solution allows to use the transmission resources of the system better, performing reception of incoming data immediately after finishing transmission and vice versa.

By changing inside TWs ratio between lengths of sub TWs used for transmission data in opposite directions, transmission resources of the system can be redistributed.

For described solution, it is important to underline relations between sub TWs and TWs of two sequences used on both sides of transmission system, which include:
  Beginnings of TWs on both sides coincide in time.
  Lengths and positions relative to the beginning of TW N of its sub TWs used for transmission by one transceiver have to coincide with lengths and positions relative to the beginning of TW N+1 of its sub TWs used for reception by other transceiver.
  Lengths and positions relative to the beginning of TW N of its sub TWs used for reception by one transceiver has to coincide with lengths and positions about the beginning of the TW N−1 of its sub TWs used for transmission by second transceiver.

The number of bits that the transceivers can send in one TW is in wide range from several bits to several millions bit. For example, for short-haul transmission systems for copper cable lines, which lengths are in range from 1 to 8 km, and for T1 transmission rate (1.544 Mbps), the number of bits per TW is in range from 9.33 to 78.7. For terrestrial microwave transmission systems, which lengths are in range from 5 to 50 km, and for T1 transmission rate, the number of bits per TW is in range from 25.8 to 258.

For fiber optic system, which length is 75 km, and for T3 transmission rate (44.736 Mbps), the number of bits per TW is 16,273. For satellite microwave systems, which lengths are in range from 1,500 to 36,000 km, and for T3 transmission rate, the number of bits per TW is in range from 223,680 to 5,368,320.

For long haul satellite, fiber optic, and microwave transmission systems, it makes sense to divide TW more than into two sub TWs. This helps decrease both delays of transmission data and sizes of transceivers' buffer memory. However, an increase of the number of sub TWs leads to proportional rising of numbers of changes directions of transmission and associated with this reduction of efficiency. Without elimination of left causes of wasting time, increased numbers of sub TWs, as a result, will have lower efficiency of transmission data. Presence of the switching time will also make the synchronization transceivers more complicated.

Synchronization

Synchronization means here a process of precise coordination or matching two or more activities, devices, or processes in time.

To work properly, transmission system built, using described in present invention, has to be supported both the TWs synchronization and the bit synchronization between transceivers 30 and 32 of the transmission system depicted on FIG. 1. The TWs synchronization assumes keeping equal length of TWs on both sides of the transmission system and supporting simultaneous beginning of TWs by both transceivers. Before starting send information, the transceivers have to establish TWs synchronization and maintain it permanently. The task of establishing and maintaining the TWs synchronization can be solved in several different ways.

After the transceivers established TW synchronization, they use it for establishing the bit synchronization by tying the bit synchronization to the already synchronized sequences of TWs on both sides of transmission line. The transceivers change the transmission rate till they transmit in every TW integer number of bits. This allows keeping the bit synchronization stable and insensitive to changes of the direction of transmission. When the transceivers divide TWs into sub TWs, they choose the length of every sub TW that they include integer numbers of bit intervals. It is important to notice that the requirement to have integer number of bits in any sub TW does not call for equal transmission rate in both directions. At least the possibility exists to use different bit rates for transmission in opposite directions since the difference in conditions of reception signals on the opposite sides of the transmission line is feasible. This will make it possible to work in every direction on its highest transmission rate and, by doing so, improve the performance of the transmission system. Tying the bit synchronization to TW synchronization gives some another advantage. When gradual changes of the propagation time take place, every transceiver can recognize this by presence either small overlapping bits during switching from reception to transmission or by small gap between received and sent bits. The transceivers on both sides use this information for proper adjustment of the length of TW. To keep in this case the bit synchronization, the transceivers leave the same number of bits in every sub TW after adjustment the length of TW. Because of the adjustment, the transceivers slightly change the transmission rate, but system will keep bit synchronization despite of changes of the propagation time.

Switching Time

The third component, which together with the propagation time and the bit synchronization influences achievable level of both the flexibility and the efficiency of the transmission systems, is the switching time. Bringing the value of switching time to zero is the condition of building the transmission system with characteristics that is good for many applications today and will be good in the future. The approach that allows bringing the switching time to zero is to choose technical solutions that use the absence of signal in transmission media to represent some values of transmitted data. Than the transition time from and to this signal and other used for transmission data signals will be as small as the transition time between any other signals used in the transmission system. In this case, during the sub TWs of reception control signals will bring and keep the value of transmitted signal equal zero. Here switching time will have value of the transition time between adjacent signals during transmission sub TWs.

Figure 4:
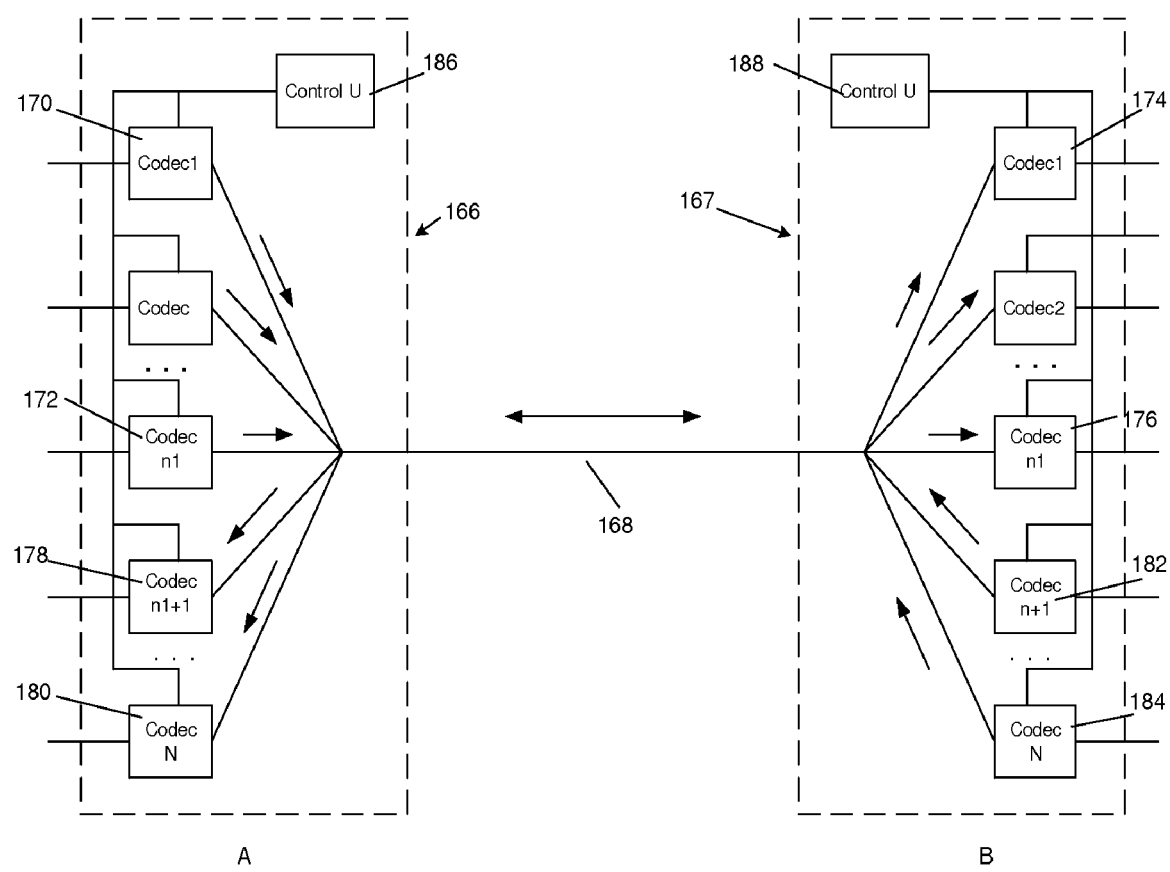
FIG. 4 shows a simplified block diagram of the transmission system disclosed in main embodiment.

Using the combination of disclosed above solutions, flexible and effective distribution of transmission system resources can be achieved for transmission systems with code division multiplexing. In this case the transmission resources of the transmission system are represented by a plurality of orthogonal polynomials. Because all orthogonal polynomials that belonging to the plurality, under certain conditions, can be sent through the transmission media simultaneously and received without interfering with each other, they can be used for transmission information belonging to different connections simultaneously. In case of binary polynomials, every polynomial is represented by special combination of ones and minus ones, which are sent through the media instead of every 1. Instead of every 0, through the media is sent combination of ones and minus ones built from the combination representing 1 by replacing every one by minus one and every minus one by one. Through the transmission media in any moment are transmitted signals generated by simultaneously active connections. All these signals are coming to the receiving side of the transmission system, where the signals represented by different polynomials are separated from each other. In order for this transmission system to work properly, it is necessary that all combinations of 1 ns and −1 ns representing 1 or 0 coming to receiving side of transmission system simultaneously. In case, all polynomials used for transmission information in one direction, to provide this condition it is enough that all these combinations started transmission in the same moment. However, in case of using one group of the orthogonal polynomials from the plurality to send information in one direction and the other group of orthogonal polynomials from the plurality, which includes the orthogonal polynomials different from ones included in the first group, on both sides of the transmission system reception of signals from the opposite side and transmission signals to the opposite side have to start simultaneously. In case the time of operations of the transmission system is divided into Time Windows and sequences of Time Windows created on both sides of the transmission system already precisely coordinated in the way that the moments of beginning of Time Windows on opposite sides coincide, this can be used to guaranty simultaneous beginning of transmission and reception of signals representing the groups of polynomials on both sides of the transmission system by starting transmission and reception of these signals in the same moments in respect to moments of beginning of every Time Window. Every orthogonal polynomial is managed by sequence 1-ns and 0-os belonging to information sent through the connection and transformed in the appropriate signal for transmission through the transmission media together with other signals belonging to other similar connections working simultaneously. Because transmission in both directions takes place simultaneously and in the same frequency range, receivers on both sides of the transmission system received all signals from the opposite side of the transmission system and also signals created by transmitter on its own side of the transmission line. Since all polynomials used for transmission are orthogonal to each other, receiver has the opportunity of selecting and decoding every signal sent from the opposite side without interference with other signals transmitting in both directions. By reassigning the orthogonal polynomials between the groups the transmission system get the opportunity of redistribution its resources between directions from 100% in A→B direction and 0% in B→A direction to 0% in A→B direction and 100% in B→A direction. This will allow to adjust distribution of transmission resources in response to changes in loads coming for transmission in opposite directions that in turn helps to use all capacity of the transmission system with code division multiplexing for serving current load independently of load's distribution between opposite directions. On the FIG. 4 is depicted a block diagram of the transmission system with code division multiplexing providing the opportunity of flexible and effective redistribution transmission resources between opposite directions of transmission. The transmission system includes the transceivers 166 and 167 and connected them the transmission media 168. Every transceiver contains N Codecs, every of which can be configured for coding or decoding information belonging to one connection by using special orthogonal polynomial belonging to the used plurality. For every Codec on side A it is exist the Codec on side B, which use the same orthogonal polynomial. If the connection is used for transmission information from side A to side B, these two Codecs have to be configured in such way that Codec on side A is configured for coding information and Codec on side B is configured for decoding information. If the connection is used for transmission information from side B to side A, the two Codecs have to be configured in such way that Codec on side A is configured for decoding information and Codec on side B is configured for coding information. On the FIG from N orthogonal polynomials representing the transmission resources of the transmission system n1 are assigned for sending information from side A to side B (Codecs between 170 and 172 have to be configured for coding and Codecs between 174 and 176 have to be configured for decoding) and (N−n1) orthogonal polynomials are assigned for transmission in the opposite direction, from side B to side A (Codecs between 178 and 180 have to be configured for decoding and Codecs between 182 and 184 have to be configured for coding). Control units 186 and 188 exert precisely coordinated control over the Codecs on both sides of the transmission system, changing when it is necessary numbers of Codecs used for transmission in every direction to improve both performance of the transmission system and quality of service of transmitted information.

Additional Embodiment

Because moments of beginning the transmission of the combinations of 1 ns and −1 ns representing all orthogonal polynomials coincide, all combinations independently of direction of transmission they used, will come to the middle of the transmission media simultaneously. In view of this, the Codecs in the middle of the media (Side C) can receive and decode or code and send any of these combinations without interference. If some of the orthogonal polynomials assign for connections between the transceivers on both sides A and B and the transceiver in the middle of transmission media, the transmission method can be applied for flexible and effective distribution transmission resources of the transmission system among three transceivers. In this case, the plurality of orthogonal polynomials has to be divided in 6 groups in proportion depending on current requirements (A→B, A→C, B→A, B→C, C→A, C→B). By redistribution the orthogonal polynomials among these groups, the transmission resources can be redistributed in response to changes in requirements.

Additional Embodiment

Because moments of beginning the transmission of the combinations of 1 ns and −1 ns representing all orthogonal polynomials coincide, all combinations independently of direction of transmission they used, will come to the middle of the transmission media simultaneously. In view of this, the Codecs in the middle of the media (Side C) can receive and decode or code and send any of these combinations without interference. If some of the orthogonal polynomials assign for connections between the transceivers on both sides A and B and the transceiver in the middle of transmission media, the transmission method can be applied for flexible and effective distribution transmission resources of the transmission system among three transceivers. In this case, the plurality of orthogonal polynomials has to be divided in 6 groups in proportion depending on current requirements (A→B, A→C, B→A, B→C, C→A, C→B). By redistribution the orthogonal polynomials among these groups, the transmission resources can be redistributed in response to changes in requirements.

Additional Embodiment

The fact that disclosed method provides the opportunity of reception the code combinations sent from opposite directions of transmission system in the middle of the transmission media enables increasing two times the length of the transmission media by putting there a repeater. The repeater in the middle will keep invariable the length of the Time Window that is the condition of possibility of flexible redistribution the transmission resources of the system between opposite directions of transmission.

Additional Embodiment

The fact that disclosed method provides the opportunity of reception the code combinations sent from opposite directions of transmission system in the middle of the transmission media enables increasing two times the length of the transmission media by putting there a repeater. The repeater in the middle will keep invariable the length of the Time Window that is the condition of possibility of flexible redistribution the transmission resources of the system between opposite directions of transmission.

CONCLUSION

From presented here material, you can see that described method of building transmission systems allows creating systems that combine high level of flexibility and efficiency with advantage peculiar for transmission systems with code division multiplexing—with high level of error protection. This makes described here method a good candidate for building transmission systems, which will be used in environment characterized by high level of noise.

Described here method, which uses code division multiplexing, as well as similar method which uses time division multiplexing that disclosed earlier in the U.S. Pat. No. 7,558,242, is universal and can be applied to both wireless (terrestrial and satellite microwave, shortwave, cellular, PCS, and others) and wire based (fiber optic-, UTP-, and coax-cables) transmission systems.

Described here method, which uses code division multiplexing, as well as similar method which uses time division multiplexing that disclosed earlier in the U.S. Pat. No. 7,558,242, can be implemented in transmission systems used in local loops, trunks connecting Central Offices, for long distance and international connections. It can be applied to the Internet, Public Telephone Networks, Cellular and PCS networks, Cable TV Networks, and Wireless Local Loops.

As it was underlined before, the scope of the invention has to be determined only by presented claims that are an integrated part of the patent specification.

What is claimed is:
1. A method of building transmission systems comprising of:
  (a) providing a transmission media that possess an ability to propagate signals from one end to the other for the time, which depends on said media length and material,

(b) providing two identical devices called transceivers connected to opposite ends of said media to send said signals to each other, and every of which is operable for performing acts of:
  (1) representing its operation time, which is defined here as time when any signal sent by any of said transceivers is propagated through the transmission media, as a sequence of time intervals, every of which has a length equal to the time of propagation of said signals through said transmission media and called here Time Window, and
  (2) precisely coordinating a moment of starting transmission of its said Time Window with a moment of starting transmission said Time Window of the other said transceiver for every said Time Window from its said sequence of Time Windows, and
  (3) dividing a plurality of orthogonal polynomials used for the data transmission into disjoint groups and applying one of them to send data to—and the other said group to receive data from said the other said transceiver, and
  (4) starting both transmission said group of orthogonal polynomials assigned for transmitting data to the other said transceiver and receiving the other said group of orthogonal polynomials assigned for receiving data from the opposite direction simultaneously, in the moment precisely determined in respect to the moment of beginning of transmission of said Time Window and precisely coordinated with similar operations of the other said transceiver for all sequence of said Time Windows, and
  (5) distributing transmission resources of said transmission system by changing numbers of said orthogonal polynomials assigned to every of said group,
whereby said method provides the opportunity of flexible redistribution said transmission resources represented by plurality of orthogonal polynomials between opposite directions of transmission.

2. The method of claim 1, farther including an ability of:
(a) providing third said transceiver placed accurately in the middle of said transmission media and which operation is precisely coordinated with operations of other two said transceivers,
whereby said method provides the opportunity of flexible redistribution said transmission resources represented by plurality of orthogonal polynomials among three transceivers and between opposite directions of transmission.

3. The method of claim 1, farther including an ability of
(a) providing a repeater placed accurately in the middle of said transmission media
and which operation is precisely coordinated with operations of said transceivers, whereby allowing increase two times the length of said transmission system as well as size of said Time Window.

* * * * *